United States Patent
Deak

[15] 3,650,498
[45] Mar. 21, 1972

[54] ADJUSTABLE SPRING SUSPENSION MOUNT HAVING CONSTANT STATIC DEFLECTION

[72] Inventor: James N. Deak, Summit, N.J.
[73] Assignee: Bell Telephone Laboratories, Incorporated, Murray Hill, N.J.
[22] Filed: May 2, 1969
[21] Appl. No.: 821,281

[52] U.S. Cl..............................248/18, 248/54, 248/324, 267/177
[51] Int. Cl...........................................F16f 15/00
[58] Field of Search...............248/17, 18, 54, 58, 59, 317, 248/324, 322, 327, 54 CS, 399, 377, 20; 267/177, 72; 212/61

[56] References Cited

UNITED STATES PATENTS

| | | | |
|---|---|---|---|
| 2,509,274 | 5/1950 | Nugey | 267/72 X |
| 3,116,045 | 12/1963 | Sherburne | 248/58 |
| 3,167,285 | 1/1965 | Suozzo | 248/59 X |

FOREIGN PATENTS OR APPLICATIONS

| | | | |
|---|---|---|---|
| 955,476 | 4/1964 | Great Britain | 248/17 |

Primary Examiner—J. Franklin Foss
Attorney—R. J. Guenther and William L. Keefauver

[57] ABSTRACT

A spring suspension mount for protecting a load from shock accelerations by reducing the effects of input shocks to acceptable levels. Means are provided for adjusting the mount so that, when loads of different weights within a preselected range are suspended therefrom, the mount will have a constant overall static deflection. Thus, for any load within the preselected range, the mount will have a constant vertical natural frequency.

3 Claims, 9 Drawing Figures

Patented March 21, 1972

INVENTOR
J. N. DEAK
BY B.F.Stoddard

ATTORNEY

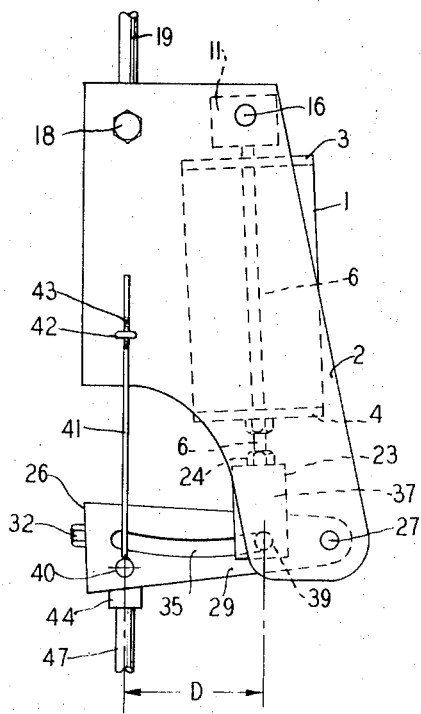
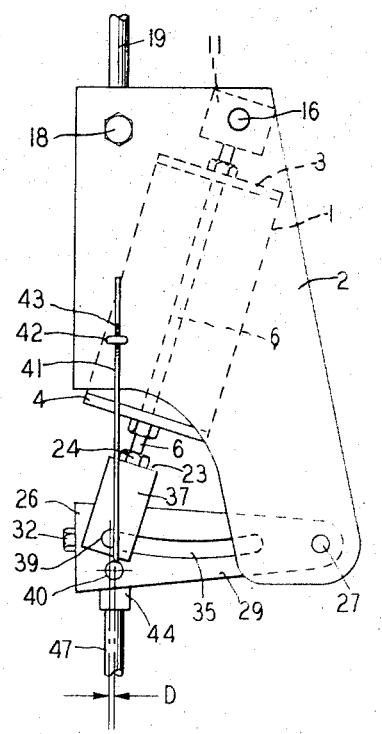
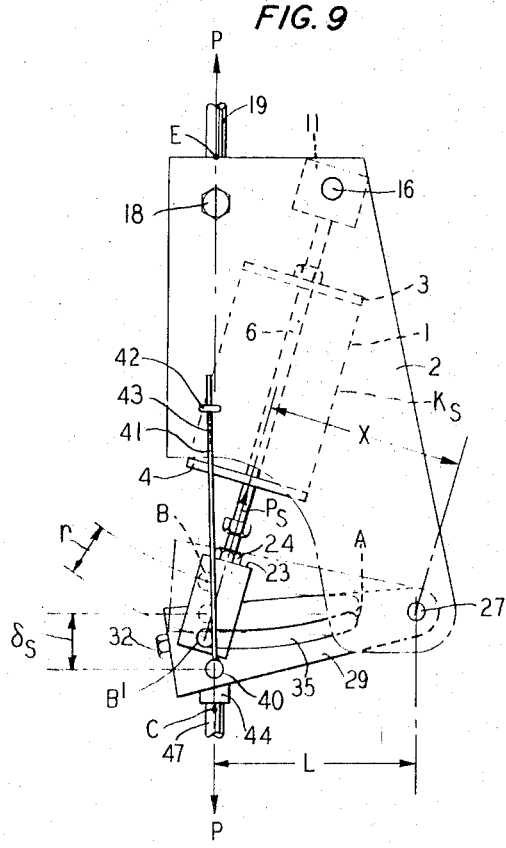

ADJUSTABLE SPRING SUSPENSION MOUNT HAVING CONSTANT STATIC DEFLECTION

BACKGROUND OF THE INVENTION

This invention relates to a spring suspension mount for suspending equipment that may become subjected to severe shock accelerations, such as those created by the explosion of a nuclear weapon. In particular, the invention relates to a pring suspension mount for reducing the effects of input shocks to acceptable levels by providing for all loads suspended therefrom, which have weights within a preselected range, a constant vertical natural frequency. More specifically, the invention relates to a spring suspension mount having adjusting means for adjusting the mount so that, when a load suspended therefrom has any weight within a preselected range, the mount will have a constant static deflection.

In general, equipment may be protected against shock waves produced by a nuclear explosion by placing the equipment inside a strongly reenforced, or hardened, chamber that is constructed in a favorable location, such as at a suitable depth under the surface of the earth. However, when the equipment includes delicate electronic devices, additional protection is required because the huge accelerations produced by a nuclear explosion would be liable to damage the electronic devices even though the equipment is located in an underground hardened chamber. The need for additional shock protection is especially urgent in the case of telephone communication equipment because much of this type of electronic equipment is mounted on tall, slender frameworks, or equipment racks, which are very susceptible to shock vibrations.

Shock protection for this type of equipment rack or framework can be provided to a certain extent by suspending the racks from the ceiling of a hardened chamber. However, if uniform spring suspension mounts are employed, the results may not be fully satisfactory because the components of the electronic equipment usually vary from one rack to another so that the combined weights of one rack and the equipment mounted thereon will be different from the combined weights of an adjacent rack and its equipment. These differences in weights will cause the spring mounts to have different degrees of static deflection and, when a shock overpressure wave arrives, the suspended equipment racks will oscillate at different frequencies and will be out of phase with each other. Furthermore, they will have different response accelerations, some of which may exceed the acceptable limits.

Accordingly, there is a need for fabricating spring suspension mounts which can be readily adjusted so that, when equipment frameworks having different weights within a preselected range are suspended therefrom, all of the mounts will have a constant static deflection. This would enable each of the mounts to have the same constant vertical natural frequency regardless of which weight, within the preselected range, it is carrying. In addition, the components of such an adjustable mount should be so constructed that, when a shock wave of a particular magnitude occurs, the response acceleration of the mount and the equipment suspended therefrom would be restrained and would not exceed an acceptable limit.

SUMMARY OF THE INVENTION

The present invention is designed to furnish shock protection for sensitive electronic equipment, which is mounted on tall frameworks, by providing an improved adjustable spring suspension mount for suspending the frameworks and their equipment from the ceiling of an underground hardened chamber. The improved mount comprises a helical spring which is mounted within a housing in such a manner that it is always loaded, both statically and dynamically, in compression. This is accomplished by placing a plate at each end of the spring and by slidably mounting both plates on three parallel rods which are encompassed by the spring. Two of the rods are fastened to a clevis located above the spring and pivotally secured to the upper portion of the housing which, in turn, is attached to the ceiling of the chamber. The third rod is secured to a second clevis which is positioned below the spring.

The overall static deflection of this suspension mount is adjustable due to the fact that the second clevis is movably mounted in two parallel slots formed in a blade having one end pivotally attached to the lower portion of the housing and having its other end fastened to the top of the equipment framework. Means are provided for adjusting the position occupied by the second clevis in the slots of the pivoted blade so that this clevis can be moved to any point within the limits fixed by the ends of the slots. Due to the fact that the middle rod in the spring is fastened to the second clevis, the movement of this clevis in the slots serves, in effect, to adjust the point of attachment of the spring to the pivoted blade. Since the blade is, in turn, fastened to the equipment framework, the movement of the clevis may be considered as, in effect, varying or adjusting the point of attachment of the spring to the load.

The slots are shaped in such a manner that, when the clevis is moved to one end of the slots, the spring will be slightly deflected but, when the clevis is moved to the other end of the slots, the spring will have a larger deflection. Thus, the movement of the clevis functions to vary the static deflection of the spring so that its axial force is adjusted to counteract variations in the weight of an equipment framework attached to the pivoted blade. A deflection indicator is provided for indicating when the proper balance, or deflection of the mount, has been obtained. In this way, the suspension mount can be adjusted to have a constant static deflection and, therefore, a constant vertical natural frequency.

In one embodiment of the invention, the suspension mount is so constructed and adjusted as to respond to a vertical velocity step function of 50 inches per second, such as might be caused by a 50 p.s.i. environment, by limiting the response acceleration of an equipment framework so that it will not exceed 3g.

BRIEF DESCRIPTION OF THE DRAWING

The features of this invention are fully discussed hereinafter in connection with the following detailed description of the drawing in which:

FIG. 7 is a side view of the spring suspension mount showing the position to which the lower clevis is adjusted for holding a light load;

FIG. 8 is a side view somewhat similar to FIG. 7 but showing the position to which the lower clevis is adjusted for a heavy load; and FIG. 9 is another side view that is somewhat similar to FIG. 7 but which shows the pivotally mounted blade in two positions, one of which is indicated with broken lines.

DETAILED DESCRIPTION

Figure 1:
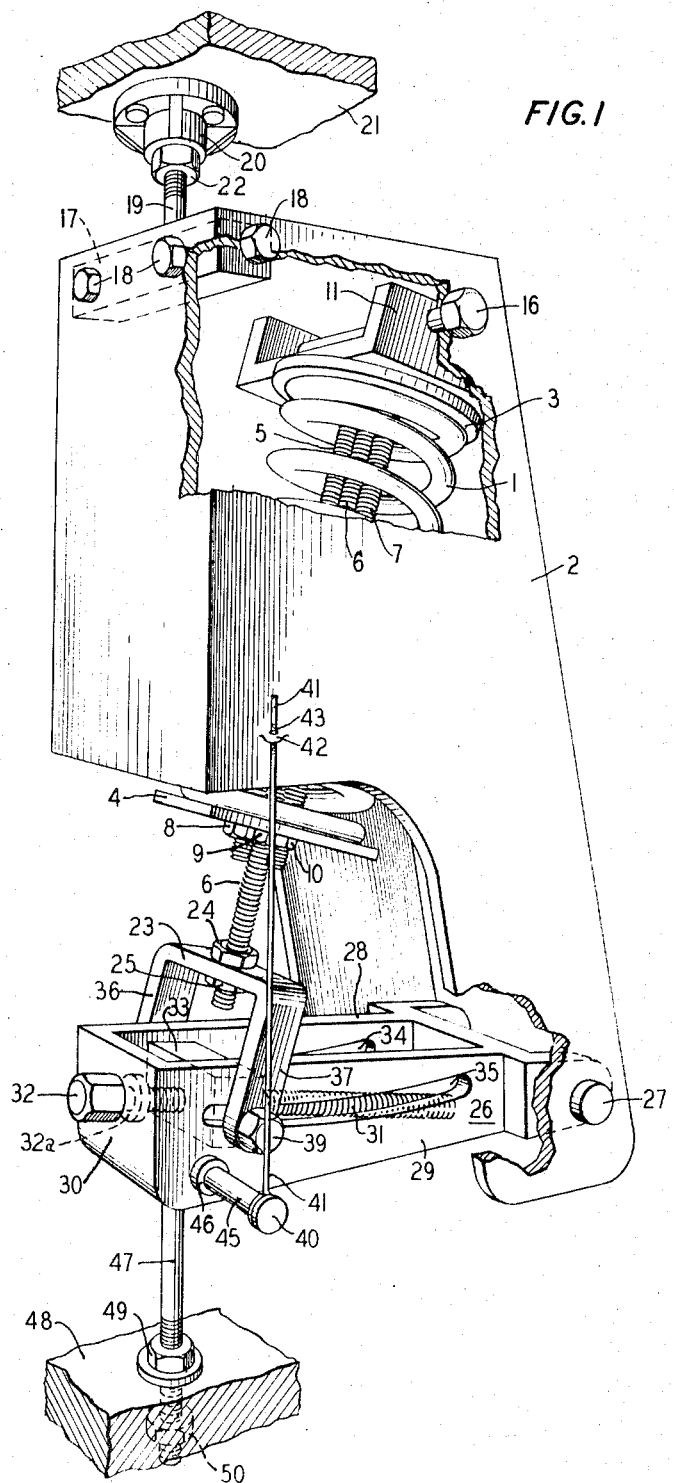
FIG. 1 is a perspective view of the spring suspension mount of this invention.

In FIG. 1, a spring suspension mount in accordance with this invention is represented as comprising a helical spring 1 surrounded by a housing 2. The upper end of the spring 1 abuts against a top plate 3 while the lower end of the spring 1 abuts against a bottom plate 4. Each of the plates 3 and 4 has three holes drilled therethrough for loosely receiving three threaded rods 5, 6, and 7 which are disposed within the coils of the spring 1. This construction permits the plates 3 and 4 to slide up and down the rods 5, 6, and 7 as is explained in detail hereinafter.

Figure 2:
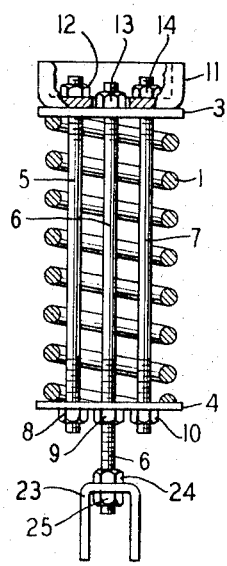
FIG. 2 is a sectional view showing the three rods encompassed by the spring which has a plate and clevis disposed at each end thereof.
Figure 3:
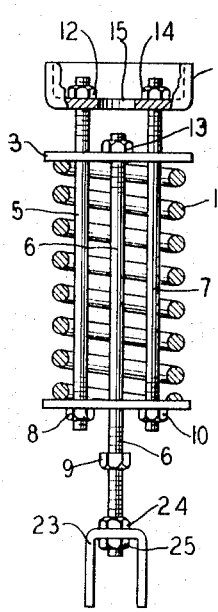
FIGS. 3 and 4 are sectional views somewhat similar to FIG. 2 but which illustrate the manner in which the movement of the bottom clevis causes movement of the central rod and either the bottom or top plate.
Figure 4:
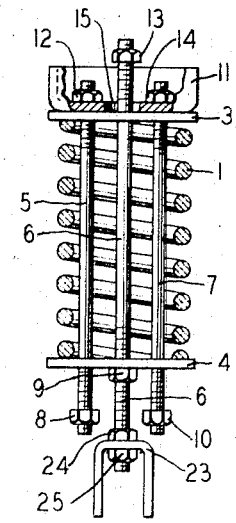

The bottom plate 4 is held on the rods 5, 6, and 7 by means of three nuts 8, 9, and 10 which are each threaded on a respectively different one of the rods 5, 6, and 7. The upper plate 3 normally abuts against an upper clevis 11 which has three holes drilled therethrough for receiving the upper ends of the rods 5, 6, and 7. Three nuts 12, 13, and 14 are each threaded on the upper portion of a respectively different one of the rods 5, 6, and 7 as is shown in FIGS. 2, 3, and 4. It should be noted that the middle hole 15 in the clevis 11 is made sufficiently large so that the nut 13 can readily pass therethrough under circumstances described hereinafter.

The nuts 12 and 14 serve to fasten the two outer rods 5 and 7 to the clevis 11. Also, when the nuts 12 and 14 are threaded further down the rods 5 and 7, the effective length of each of the rods 5 and 7 is shortened thus causing the lower plate 4 to be pulled upward for producing a squeezing effect on the spring 1 and for thereby functioning to load the spring 1 statically in compression.

As can be seen in FIG. 1, the upper clevis 11 has one of its side attached to the housing 2 by means of a pivot pin 16. A similar pivot pin, which is not shown in the drawing, extends through the opposite part of the housing 2 into the opposite side of the clevis 11. Thus, the pivot pin 16 and its companion pivot pin serve to pivotally mount the clevis 11 near the top of the housing 2. In this manner, the upper end of the spring 1 is pivotally mounted within the housing 2 so that it can be swung back and forth.

A reenforcing bar 17 is located inside the housing 2 near the top thereof, as is shown in FIG. 1, and is fastened to the housing 2 by screws 18. A vertically disposed suspension rod 19 has its lower end securely attached to the top of the bar 17 in any suitable manner. The upper end of the rod 19 is threaded and extends into a U fitting 20 which is mounted either on the ceiling 21 of the hardened chamber or on a beam attached thereto. This upper end of the rod 19 is fastened to the U fitting 20 by a jam nut 22. In this manner, the spring mount is securely mounted, or suspended, from the ceiling 21 of the hardened chamber.

The rod 6, which is shown to be positioned along the axis of the spring 1, is made longer than its two associated outer rods 5 and 7 so that it can be fastened to a bifurcated member in the form of a second, or lower, clevis 23 by means of two nuts 24 and 25. In this manner, the lower end of the spring 1 is attached to the lower clevis 23. This lower clevis 23 is adjustably secured to a blade 26 which has one end pivotally attached to the lower portion of the housing 2 by means of a long pivot pin 27.

Figure 5:
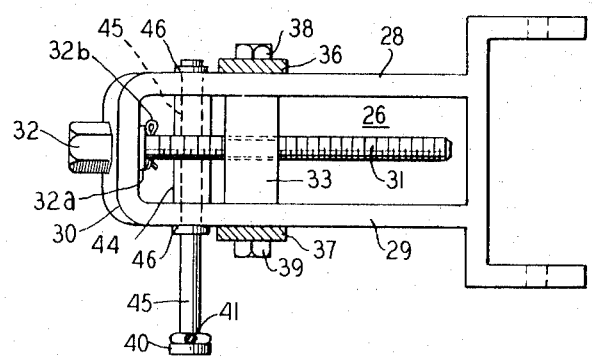
FIG. 5 is a plan view of the blade and its associated adjusting mechanism.
Figure 6:
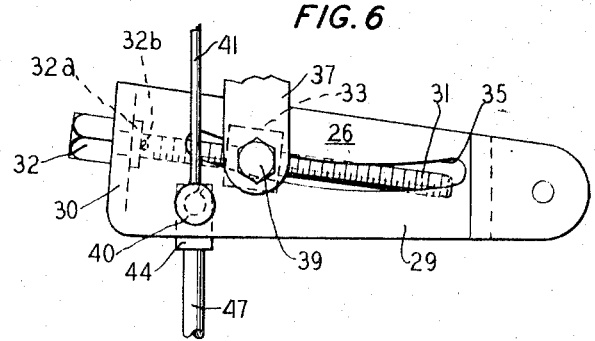
FIG. 6 is a side view of the blade showing one of the slots formed therein.

FIG. 5 is a plan view of the blade 26 and shows that it comprises two side portions 28 and 29 and a front portion 30 having a hole therein for receiving a threaded travel screw 31 having a hexagonal head 32. The head 32 is held against the front portion 30 by any suitable means, such as a washer 32a and a cotter pin 32b. The travel screw 31 passes through a threaded hole in an adjusting block 33 which is positioned between the side portions 28 and 29. Two parallel slots 34 and 35 are each formed in a respectively different one of the side portions 28 and 29 of the blade 26 and are slightly curved in an arcuate shape as is best seen in FIG. 6.

The lower clevis 23 is made wider than the blade 26 so that its legs 36 and 37 can fit against the outer surfaces of the side portions 28 and 29 of the blade 26 as is best shown in FIG. 1. These legs 36 and 37 of the lower clevis 23 are fastened to the adjusting block 33 by screws 38 and 39. Since the screws 38 and 39 pass through the slots 34 and 35, they function to slidably attach the clevis 23 and the spring 1 to the blade 26. Thus, when the head 32 of the travel screw 31 is turned in either direction, the rotation of the travel screw 31 will drive the adjusting block 33 forward or backward in accordance with the direction in which the head 32 is turned. During this movement, the adjusting block 33 will carry with it the lower clevis 23 since the screws 38 and 39 will slide in the arcuate slots 34 and 35. The forward or backward movement of the lower clevis 23 will, in turn, cause the upper clevis 11 to swing on its pivot pins 16. Thus, the travel screw 31 functions as actuating means for, in effect, swinging the spring 1 back and forth in a path which is predetermined, or limited by the slots 34 and 35.

A reenforcing bar 44 is located between the sides 28 and 29 of the blade 26 and is pivotally mounted on a long pivot pin 45 which is held in place by snap rings 46. This bar 44 is positioned beneath the travel screw 31 as is best seen in FIG. 6. One portion of the pivot pin 45 protrudes an appreciable distance beyond one side 29 of the blade 26. The end of this extended portion of the pivot pin 45 has a reduced diameter so as to form a shoulder.

A tall, slender rod 41 has its lower end formed in a loop which is loosely mounted on the reduced diameter portion of the pivot pin 45. The looped portion of the rod 41 is rotatably attached to the shoulder of the pivot pin 45 by a screw having a large head, such as a shoulder screw 40, which is threaded into the end of the pivot pin 45. The rod 41 extends upward with its upper portion passing loosely through an eye screw 42 which is fastened to the housing 2. Thus, when the blade 26 moves about its pivot pin 27 in either an upward or downward direction, the upper portion of the rod 41 will correspondingly move upward and downward through the eye screw 42. A section 43 of the rod 41 that extends immediately above and below the eye screw 42 is distinctively colored for a reason that is explained hereinafter.

A downwardly extending suspension rod 47 has its upper end securely attached to the bottom of the bar 44 in any suitable manner. The rod 47 is threaded and its lower portion passes through a hole drilled in the top portion of an equipment rack or framework 48 which is to be suspended by the spring mount of this invention. The rod 47 is securely fastened to this top portion of the framework 48 by any appropriate means, such as by jam nuts 49 and 50. In this manner, the spring mount serves to suspend the framework 48 from the ceiling 21 of the hardened chamber.

As was stated above, the framework 48 is designed to hold delicate electronic devices, such as telephone equipment, which require protection against shock vibrations, such as might be caused by the shock overpressure wave of a nuclear explosion. This protection is provided by the spring mount in a manner that will now be explained with reference first to FIGS. 2, 3, and 4.

In FIG. 2, it is assumed that the equipment framework 48 has not been attached to the spring mount. Therefore, at this time, the only load applied to the spring 1 is the relatively light compressional force exerted by the squeezing effect produced when the upper and lower plates 3 and 4 are moved toward each other in response to the tightening of the nuts 8, 9, 10, 12, 13, and 14. This tightening is made just sufficient so there will be no looseness in the assembly. Accordingly, in this preliminary condition, the spring 1 will be only slightly loaded in compression.

When the equipment framework 48 is suspended from the lower suspension bar 47, its weight will cause the middle rod 6 to be pulled downward through the middle hole in the bottom plate 4 as is shown in FIG. 3. This action will cause the nut 13 on the upper end of the rod 6 to force the upper plate 3 to slide downward on the two outer rods 5 and 7. In this manner, the spring 1 will be compressed to the extent shown in FIG. 3 which may be regarded as the normal static deflection of the spring 1 when loaded by an equipment framework 48.

If a severe shock wave should arrive while the equipment framework 48 is suspended from the spring mount, it might force the equipment framework 48 downward. This action would cause the upper plate 3 to be pulled further downward, thus additionally compressing the spring 1. Since the spring 1 is already loaded in compression, it will resist being further compressed and will thus function to minimize any additional downward movement of the equipment framework 48.

On the other hand, if the shock wave should force the equipment framework 48 upward, then the middle rod 6 will be pushed upward through the middle hole in the upper plate 3 as is shown in FIG. 4. This action will cause the nut 9 on the lower portion of the rod 6 to force the bottom plate 4 to slide upward on the two outer rods 5 and 7 thereby compressing the spring 1. Since the spring 1 is always loaded in compression, it will resist additional compression and will thereby function to minimize the extent of this upward movement of the equipment framework 48. From this explanation, it can be understood that a shock overpressure wave never causes the spring 1 to be extended in tension because the spring 1 always responds in compression.

Since different frameworks 48 may hold electronic equipment of various weights, they would affect the spring 1 differently so as to cause its normal static deflection, shown in FIG. 3, to vary. In other words, heavy equipment would tend to compress the spring 1 to a greater degree than light equipment. Such variations in the static deflection of the spring 1 must be counteracted by adjusting the point of attachment of the spring 1 to the pivoted blade 26 and, in effect, to the load represented by the framework 48 so that, for any load within a preselected range, the overall static deflection of the suspension mount as an entirety will be constant. Thus, as long as the weight of a particular load is within the limits of this preselected range, the mount will have a constant vertical natural frequency.

It is appropriate at this point to state that the dynamic input motions of a shock overpressure wave created by a nuclear explosion can transmit shock motion in a horizontal direction and also in a vertical direction to the electronic equipment that is stored in the hardened chamber. Protection against horizontal shock transmission is provided by mounting the electronic equipment on the tall, slender frameworks 48 which are each suspended from an individually associated spring mount of the type shown in FIG. 1. Being thus suspended, each framework 48 and its associated electronic equipment function like a pendulum. Therefore, horizontal shock protection, or isolation, is furnished by the low natural frequency of the long pendulums constituted by the frameworks 48 and the equipment mounted thereon. Protection, or isolation, against vertical shock transmission is provided by the constant vertical natural frequency of the spring mount of this invention.

It has been determined that the electronic equipment in the hardened chamber should be capable of withstanding the blast and shock effects that might be produced when the ceiling 21 of the hardened chamber is subjected to a 50 p.s.i. peak overpressure environment created by a nuclear explosion. Accordingly, an exemplary embodiment of the spring mount of this invention is designed to suspend a framework 48 having mounted thereon equipment that has a weight ranging from 150 pounds to 1,500 pounds. Furthermore, the shock mount is so constructed and adjusted as to respond to a vertical velocity step function of 50 inches per second, such as might be caused by a 50 p.s.i. environment, by limiting the response acceleration of a framework 48 and its electronic equipment so that it will not exceed 3 g.

In other words, when the suspension point constituted by the ceiling 21 is subjected to a velocity step function that does not exceed 50 inches per second, the maximum vertical shock acceleration transmitted through the spring mount to the framework 48 and its equipment will be limited to 3 g. regardless of whether the weight of the equipment is 150 pounds of 1,500 pounds.

This is accomplished by appropriately adjusting the position of the lower clevis 23 at the time when the framework 48 and its equipment are fastened to the lower suspension rod 47. As was stated above, when the head 32 of the travel screw 31 is turned, the rotation of the travel screw 31 will move the adjusting block 33 and the lower clevis 23. Thus, the lower clevis 23 can be located at any desired position in the slots 34 and 35 of the blade 26. When the equipment carried by the framework 48 has the minimum weight of 150 pounds, the travel screw 31 is rotated in a direction such as to cause the lower clevis 23 to move toward the pivot pin 27 of the blade 26. Accordingly, the lower clevis 23 will be moved to the position shown in FIG. 7.

It can be seen in FIG. 7, that a perpendicular line dropped from the screw 39 in the leg 37 of the clevis 23 is separated from a perpendicular line dropped from the shoulder screw 40, which is in the pivot pin 46 in the reenforcing bar 44, by a distance indicated by the reference character D. The deflection of the spring 1 can be varied by varying the distance D because the deflection of the spring 1 increases inversely with the distance D. In other words, when the distance D is at its maximum, as is shown in FIG. 7, the spring 1 will have a slight deflection. On the other hand, when the distance D is at its minimum, as is shown in FIG. 8, the spring 1 will have a large deflection.

In view of the above explanation, when the equipment carried by the framework 48 has the maximum weight of 1,500 pounds, the travel screw 31 is rotated in such a direction as to cause the lower clevis 23 to move toward the head 32 of the travel screw 31. The lower clevis 23 will thus assume the position shown in FIG. 8.

It should be noted that, in both FIGS. 7 and 8, the positions of the rod 41 are such that the eye screw 42 on the housing 2 is in the middle portion of the colored section 43 of the rod 41. This indicates that the pivotally mounted blade 26 has not changed its horizontal position even though in FIG. 7 a light load is attached to the suspension rod 47 whereas in FIG. 8 the suspension rod 47 is carrying a heavy load. The reason for this is that proper adjustment of the travel screw 31 will cause the spring mount to have a constant static deflection for any load in the preselected range of 150 pounds to 1,500 pounds. The spring suspension mount must have this constant static deflection in order for it to have a constant vertical natural frequency for any load within the preselected range.

It was stated above, that in this exemplary embodiment of the invention, the objective is to reduce the shock felt by the electronic equipment on the framework 48 to an acceleration level of 3 g. when the ceiling 21 of the hardened chamber is subjected to a 50 inch per second velocity shock. The required constant vertical natural frequency of the spring mount that is required to limit the response accelerations is computed from the equation:

$$f = \frac{gA}{2\pi V}$$

where:
$g = 386$ in./sec.$^2$
$A =$ maximum response absolute acceleration—3 g.'s
$V =$ vertical velocity step—50 in./sec.
then $$f = \frac{(386)(3)}{2\pi(50)} = 3.68 \text{ Hz.}$$

Having thus calculated the required constant vertical natural frequency of 3.68 Hz., the necessary constant static deflection, $\sigma_s$, of the spring mount is computed from the equation:

$$\delta_s = \frac{g}{(2\pi f)^2}$$

or:

$$\delta_s = \frac{386}{[(2\pi)(3.68)]^2} = 0.72 \text{ inch.}$$

Therefore, when the spring mount is so designed and constructed as to have a constant static deflection of 0.72 inch, the spring mount will have a constant vertical natural frequency of 3.68 Hz. Accordingly, when a shock having a magnitude not exceeding a vertical velocity step function of 50 inches per second is received, the spring mount will limit the response acceleration of the framework 48 and its electronic equipment to a maximum of 3 g. regardless of whether the equipment weighs 150 pounds or 1,500 pounds.

The manner in which this constant static deflection of 0.72 inches is obtained will now be explained with particular reference to FIG. 9 which shows the pivoted blade 26 in two positions, one of which is indicated with broken lines. The position of the blade 26 that is shown in broken lines in FIG. 9 is its undeflected position and corresponds to the position represented in FIG. 2 wherein no load is attached to the lower suspension rod 47. When a load is fastened to the lower suspension rod 47, the pivoted blade 26 tilts downward to its deflected position, as is shown in solid lines in FIG. 9, and this corresponds to the condition illustrated in FIG. 3.

In the situation where no load is attached to the spring mount and the blade 26 is in the position shown in broken lines in FIG. 9, each portion of the slots 34 and 35 will be equidistant from the pivot pin 16 in the upper clevis 11. In other words, the slots 34 and 35 may be considered as constituting arcs drawn by using the position of the pivot pin 16 as a center. Because of this, the distance from the right ends, indicated by the reference character A, of the slots 34 and 35 to the pivot pin 16 is the same, when the blade 26 is in this position, as the distance from the left ends, represented by the reference character B, of these slots 34 and 35. Therefore, when the lower clevis 23 is moved from one end A of the slots 34 and 35 to the opposite end B, no pulling or pushing force will be exerted on the middle rod 6. Accordingly, at this time, the movement of the lower clevis 23 will not apply any force to the spring 1 and will not change the position of the blade 26.

When a load is applied to the lower suspension rod 47, such as by the attachment of a framework 48 and its associated electronic equipment, the weight of this load will tend to pull the left end of the blade 26 downward thereby causing it to rotate about its pivot pin 27 so that it will assume the position shown by the solid lines in FIG. 9. Here it can be seen that, although the position A of the right ends of the slots 34 and 35 is only slightly changed, the left ends of the slots have moved from the position B to a lower position indicated by the reference character B'.

It can also be seen that the distance from the position B' to the pivot pin 16 is greater than the distance from the position B to the pivot pin 16. Therefore, when the lower clevis 23 is moved to the position B', the increase in the distance from the left ends of the slots 34 and 35 to the pivot pin 16 can only be accommodated by pulling the middle rod 6 downward as indicated in FIG. 3. As was explained above, the downward movement of the middle rod 6 causes the upper plate 3 to be pulled downward thereby further compressing the spring 1 and increasing its deflection. Thus, the downward rotation of the blade 26 about its pivot pin 27 is opposed by the upwardly acting axial force in the spring 1.

The downward movement of the left end of the blade 26 may be regarded as representing the static deflection of the spring mount when loaded by an equipment framework 48. This static deflection may be measured by the distance between a horizontal line drawn in FIG. 9 through the center of the shoulder screw 40 when the blade 26 is in its unloaded position, shown in broken lines, and a similar horizontal line drawn through the shoulder screw 40 when the blade 26 is in static loaded position, shown in solid lines. The distance representing the static deflection is indicated in FIG. 9 by the reference character $\sigma_s$ and this is the dimension that should remain invariant regardless of whether the framework 48 is carrying a minimum load of 150 pounds or a maximum load of 1,500 pounds.

The proper point at which the lower clevis 23 should be positioned in the slots 34 and 35 for a particular load applied to the suspension point, indicated by the reference character C, can be calculated because the sum of the moments (force times distance) about any point must be equal to zero in order to establish static equilibrium. Assuming that the effect of friction is disregarded, the moments about the pivot pin 27 can be summed as follows:

$$PL - P_s X = 0$$

where:

$P$ = static load (pounds)
$P_s$ = axial load in the spring assembly (pounds)
$L$ = length of a line perpendicular to line C – E and intersecting the pivot pin 27 (inches)
$X$ = length of a line perpendicular to the axis of the spring assembly and intersecting the pivot pin 27 (inches).

The axial load $P_s$ can be calculated by multiplying the spring stiffness $K_s$ by the spring deflection $r$ as follows:

$$P_s = r K_s$$

By substituting this value of $P_s$ into the previous equation, the required stiffness of the spring 1 will be expressed as follows:

$$K_s = \frac{PL}{rX}$$

As a specific example of an exemplary embodiment of the invention for a maximum static load of 1,500 pounds and where:

$L = 7.9$ inches
$X = 7.7$ inches
$r = 0.74$ inch the required spring stiffness is:

$$K_s = \frac{(1.500)(7.9)}{(0.74)(7.7)} = 2090 \text{ lb./in.}$$

When a spring having this fixed stiffness is used for a lighter static load, the blade 26 would tend to swing upward thereby reducing the numerical value of the static deflection $\sigma_s$. However, as was explained above, this value should remain invariant for different loads within the preselected range in order for the vertical natural frequency of the spring mount to be constant. As was also explained above, this is accomplished by rotating the head 32 of the travel screw 31 so as to move the lower clevis 23 toward the right ends A of the slots 34 and 35. In other words, the length $X$ is varied to produce an adjustment in the spring deflection $r$ so as to compensate for the smaller value of the static load $P$. Thus, the deflection $r$ of the spring 1 is controlled by control means, including the lower clevis 23, which are adjusted by means of the travel screw 31.

This can be better understood by transposing the above equation so that it will have the form of:

$$\frac{P}{Xr} = \frac{K_s}{L}$$

Since the spring stiffness $K_s$ and the value $L$ are both constants, then $$\frac{P}{Xr} = k$$

or, $$Xr = kP$$

Thus, the product of the value of the length $X$ and the corresponding value of the spring deflection $r$ must be adjusted so that it will equal the product of the constant $k$ and the new value of the static load $P$.

The correct position of the lower clevis 23 for obtaining the appropriate value of the product $Xr$ for a specific static load $P$ is indicated by the position of the colored section 43 of the rod 41 with respect to the eye screw 42. If the lower clevis 23 is too close to the left ends of the slots 34 and 35, the colored section 43 will be positioned above the eye screw 42. On the other hand, if the lower clevis 23 is too near the right ends of the slots 34 and 35, the colored section 43 will be located beneath the eye screw 42. It is only when the colored section 43 is bisected by the eye screw 42, that the lower clevis 23 is in the proper position. In this way, the colored section 43 functions as an indicator to show when the lower clevis 23 has been moved to the correct position for maintaining the desired constant static deflection $\sigma_s$.

What is claimed is:

1. A suspension mount adapted for suspending a load therefrom in such a manner as to limit its response acceleration resulting from the impact thereon of shock motion transmitted in a vertical direction and tending to force said load to move in an upward direction, said mount comprising a housing having an upper portion and a lower portion, a helical spring having a first end and a second end, pivot means for pivotally attaching said first end of said spring to said housing within said upper portion thereof and with the longitudinal axis of said spring vertically disposed, a blade having a first end pivotally attached to said lower portion of said housing, said blade having means at a second end thereof adapted for suspending a load therefrom, said blade having an undeflected position when no load is suspended therefrom and a deflected position when a load is suspended therefrom, said second end of said blade being adapted to be pushed upward in response to said shock-impelled upward movement of said load, said second end of said blade also being adapted to be pulled downward in response to the movement of said blade from said undeflected position to said deflected position, and control means for establishing a constant static deflection of said blade for a suspended load of any weight within a preselected range and for thereby providing said mount with a constant vertical natural frequency, said control means comprising connecting means for connecting said second end of said spring to said blade at a point between said first and second ends of said blade, said connecting means including a connecting member adapted for constantly loading said spring in compression in such a manner as to impede both downward and upward movements of said second end of said blade, said connecting means further including means defining an arcuate slot in said blade such that when said blade is in its undeflected position said slot defines an arc drawn by using said pivot means as a center.

2. A suspension mount in accordance with claim 1 wherein said connecting member comprises a rod having at least a portion thereof disposed within said spring in parallel with the longitudinal axis thereof, said rod having another portion thereof connected to said blade at a point between said first and second ends of said blade, first means attached to said rod for increasing said compressional loading of said spring in response to said downward movement of said second end of said blade, and second means attached to said rod for increasing said compressional loading of said spring in response to said upward movement of said second end of said blade.

3. A suspension mount adapted for suspending a load therefrom in such a manner as to limit its response acceleration resulting from the impact thereon of a shock wave, said mount comprising a housing having an upper portion and a lower portion, a blade having one end pivotally attached to said lower portion of said housing, said blade having means at another end thereof adapted for suspending a load therefrom, said blade having an undeflected position when no load is suspended therefrom and a deflected position when a load is suspended therefrom, and control means for providing a constant static deflection of said blade for a suspended load of any weight within a preselected range and for thereby providing said mount with a constant vertical natural frequency, said control means comprising a helical spring having a first end and a second end, means for constantly loading said spring in compression, pivot means for pivotally mounting said first end of said spring within said upper portion of said housing, connecting means for connecting said second end of said spring to said blade at any one of various alternative points of connection along the length of said blade, varying means for varying said compression of said spring, said varying means including adjustable means for swinging said spring about said pivot means for thereby adjusting its point of connection to said blade, and means for rendering said varying means ineffective for varying said spring compression when said blade is in its undeflected position, said last-mentioned means including means defining an arcuate slot in said blade such that when said blade is in its undeflected position every portion of said slot is equidistant from said pivot means.

* * * * *